April 13, 1965 W. A. SCHOEFFLER ETAL 3,177,966
RELEASABLE ANCHORING MECHANISM FOR SAFETY SEAT BELTS
Filed April 3, 1962 2 Sheets-Sheet 1
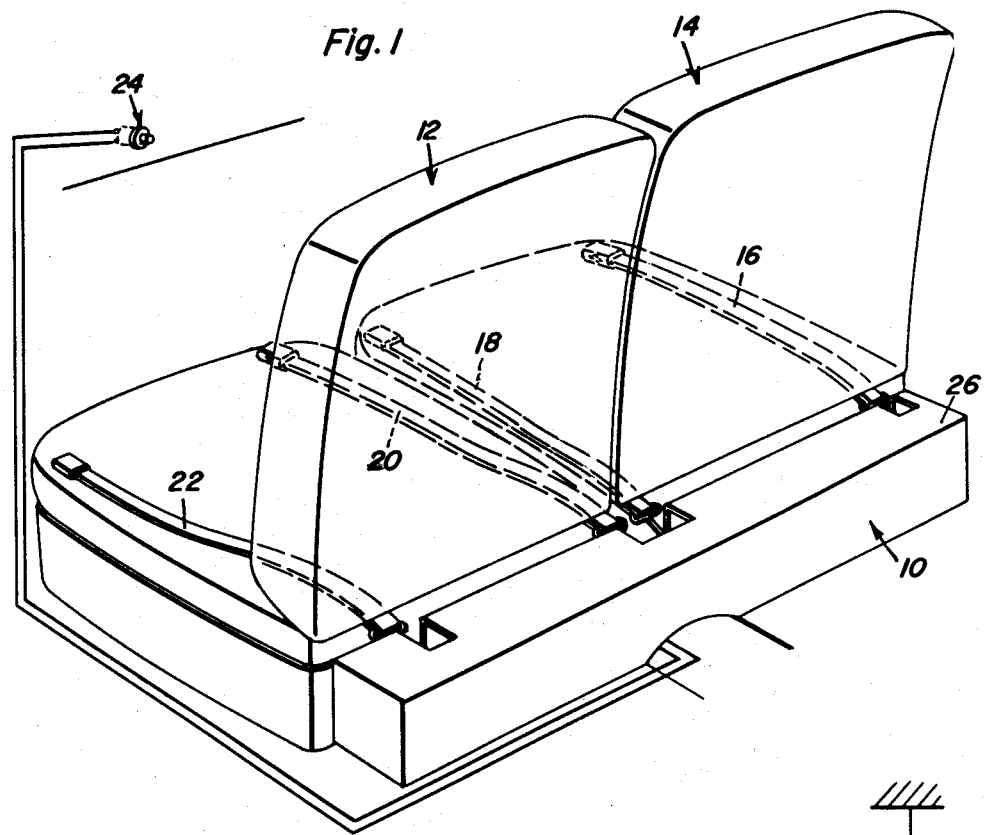
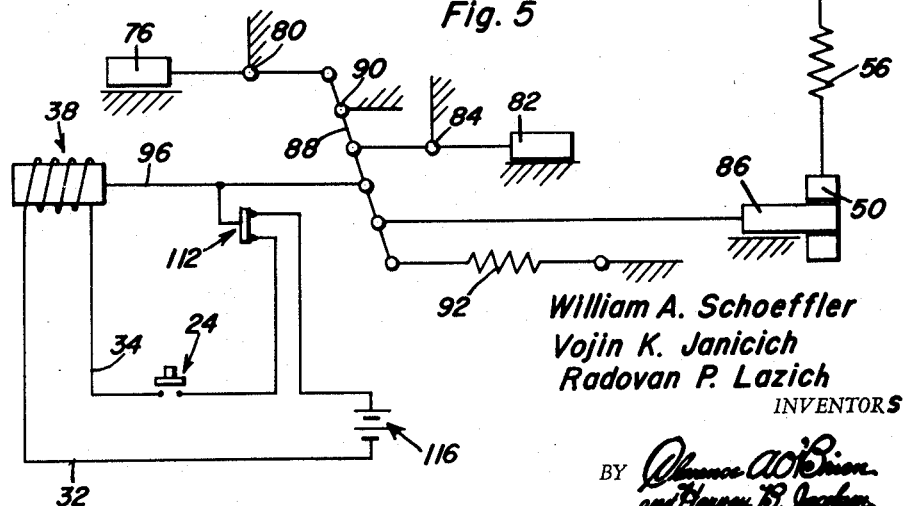
William A. Schoeffler
Vojin K. Janicich
Radovan P. Lazich
INVENTORS

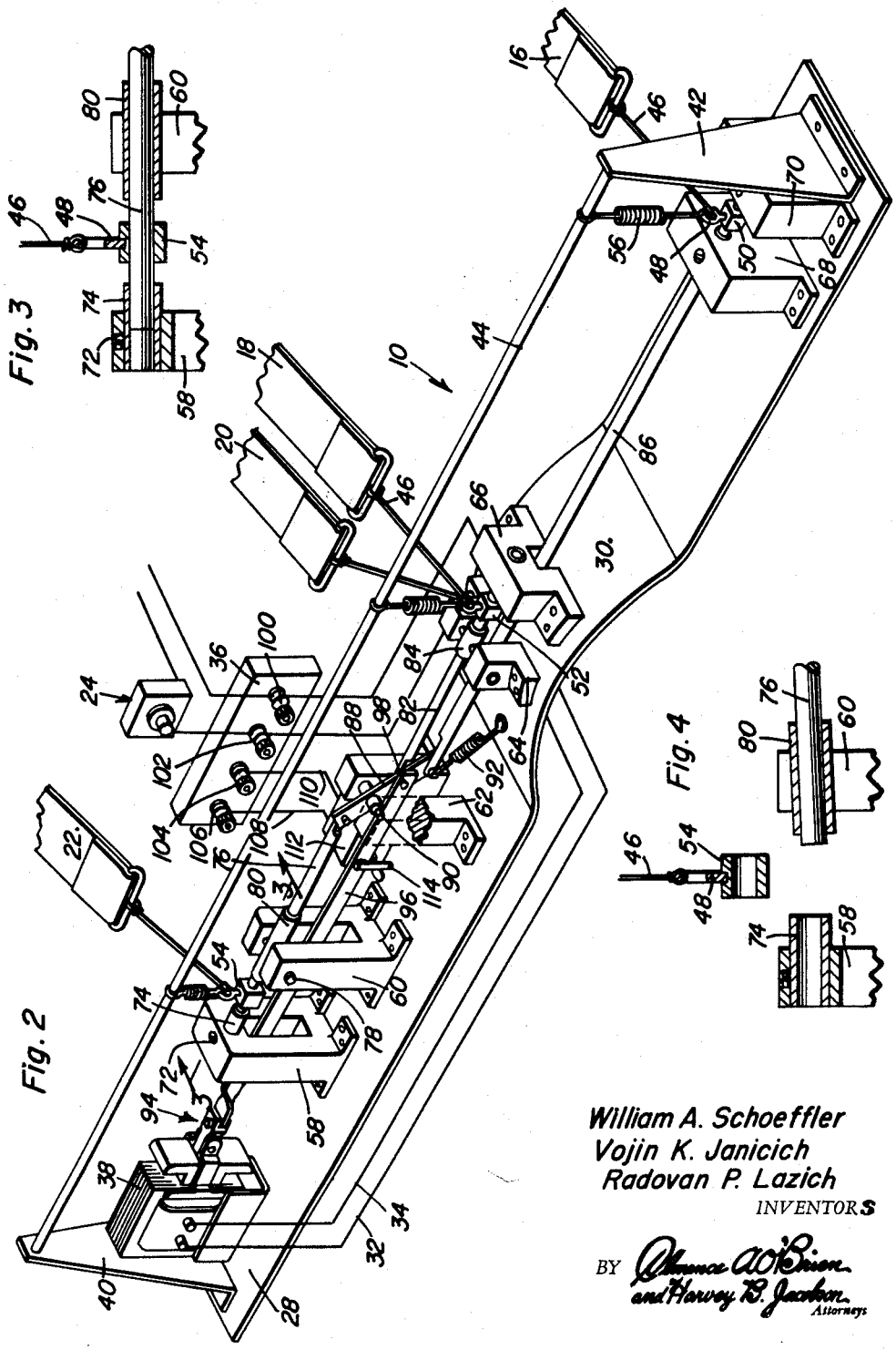

United States Patent Office 3,177,966
Patented Apr. 13, 1965

3,177,966
RELEASABLE ANCHORING MECHANISM FOR SAFETY SEAT BELTS
William A. Schoeffler, 4011 California Ave., Carmichael, Calif.; Vojin K. Janicich, 2571 23rd Ave., and Radovan P. Lazich, 2735 Kroy Way, both of Sacramento, Calif.
Filed Apr. 3, 1962, Ser. No. 184,891
11 Claims. (Cl. 180—82)

This invention relates generally to a safety system for vehicles and in particular is related to the use of safety seat belts in both automotive or aircraft vehicles.

In connection with the use of safety seat belts it is often desirable to be able to readily loosen the seat belts from a person after the occurrence of an accident. Accordingly, it is a primary object of the present invention to provide a releasable anchoring assembly for a plurality of safety seat belts whereby the seat belts may be more readily released or loosened when desired in case of emergency without requiring time-consuming fumbling with the seat belt buckles. The importance of the releasable anchoring assembly will therefore be apparent in connection with removal of injured persons from vehicle seats to which they are strapped.

Another object of the present invention is to provide in a vehicle safety system a releasable safety seat belt anchoring assembly operative in response to release of the seat belts to cut-off the power supply of the vehicle so as to further lessen the danger of fire following an accident of a serious enough nature to require emergency release of the seat belts by the releasable anchoring assembly.

An additional object of the present invention is to provide a releasable safety seat belt anchoring assembly which is readily adaptable to all types of vehicles for the purpose of anchoring safety seat belts that may be associated with the seats thereof and which releasable anchoring assembly is operated by the power supply for the vehicle under selective control of a switch to be actuated under emergency conditions following an accident for example, which calls for immediate loosening of the seat belts.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view illustrating one typical installation of the releasable safety seat belt anchoring assembly of the present invention.

FIGURE 2 is a perspective view of the releasable anchoring assembly with the casing removed.

FIGURE 3 is a partial sectional view taken substantially through a plane indicated by the section line 3—3 in FIGURE 2 illustrating a portion of the belt anchoring assembly in a belt anchoring condition.

FIGURE 4 is a partial sectional view similar to that of FIGURE 3 illustrating the anchoring assembly in a belt releasing condition.

FIGURE 5 is a diagrammatic view of the safety system with which the releasable belt anchoring assembly is associated.

Referring now to the drawings in detail, it will be observed that the releasable belt anchoring assembly generally referred to by reference numeral 10 is mounted in any vehicle as for example an automotive vehicle rearwardly of the seats 12 and 14 so as to anchor the safety seat belt sections 16, 18, 20 and 22 associated with the seats 12 and 14, said seat belt sections having the usual buckles for strapping a passenger in the seat. Mounted on the dash, control panel or any other convenient location in the vehicle, is a normally open release switch assembly 24 suitably wired to the vehicle power supply so as to provide the energizing energy for seat belt releasing purposes through the releasable anchoring assembly 10. Also, cut-off of the power supply of the vehicle will be effected following powered operation of the releasable anchoring assembly 10 as will hereafter be explained.

The releasable belt anchoring assembly 10 as shown in FIGURE 1 is enclosed within a housing 26 and as seen in FIGURE 2, is secured to the vehicle floor by means of a mounting base 28 that may be provided with a hump portion 30 through which an electrical cable may extend containing the electrical conductors 32 and 34 connected between a terminal post board 36 and the terminals of a power solenoid device 38 permanently secured to the base 28 of the assembly 10. The power operated solenoid is mounted adjacent one end of the base 28 close to one of two end brackets 40 and 42 between which a spring support rod 44 extends in spaced relation above the base 28. The anchoring end of each of the belt sections is accordingly connected by cables 46 to eye members 48 secured to anchor blocks 50, 52, and 54. The anchor ends of the belt sections 18 and 20 may therefore be connected in common to the anchor block 52 for seat belt anchoring in connection with the two seats 12 and 14 shown in FIGURE 1. Other suitable anchoring connections to the anchoring blocks may be made for accommodating seat belts associated with different seat arrangements. Each of the anchoring blocks is therefore held in anchored position above the base 28 and when released will permit loosening of the belt sections without complete disconnection from the assembly 10 however because of the connection to the connecting eye members 48 of return spring elements 56. The return spring elements are therefore connected to the spring support rod 44 and are elastically yieldable to permit loosening of the seat belts when the anchoring blocks are released. Accordingly, re-anchoring of the seat belts will be facilitated by return of the anchoring blocks to their approximate anchoring positions by the bias of the return spring elements 56. The anchoring blocks are held in anchored position, however, by spaced anchoring facilities movably mounted on the base 28.

The base 28 therefore has mounted in spaced relation there along, bracket assemblies 58, 60, 62, 64, 66, 68 and 70. The bracket assembly 58 fixedly mounts by means of the setscrew 72 a fixed slide bushing 74 which is adapted to slidably receive there within a top retractible pull rod 76. Pivotally mounted by a swivel pin 78 extending through the upper ends of the bracket assembly 60, is a swivel bushing 80 which also slidably receives the top pull rod 76. As shown in FIGURE 3, the anchoring block 54 receives therethrough the top pull rod 76 so that when it is received within the fixed bushing 74, the anchoring block 54 will be anchored between the bracket assemblies 58 and 60. Slidable withdrawal of the top pull rod 76 from the fixed bushing 74 as shown in FIGURE 4, will release the anchoring block 54 to thereby permit loosening of the belt section 22 thereafter connected to the assembly 10 only by the return spring element 56 associated with the anchoring block 54. An intermediate retractible pull rod 82 is similarly associated with a swivel bushing 84 pivotally mounted by the bracket assembly 64 and a fixed bushing fixedly mounted in the bracket assembly 66 in order to anchor and release the anchoring block 52. Finally, a lower retractible pull rod 86 extends between and through the bracket assemblies 64 and 66 and is slidably received within bushings mounted in the bracket assemblies 68 and 70 for anchoring between the latter two bracket assemblies, the anchoring block 50. It will therefore be apparent, upon slidable withdrawal of the pull rods 76, 82 and 86 from associated fixed bushings in bracket assemblies 72, 66 and 70, respectively, each of the anchoring blocks 54, 52 and 50 will be released.

In order to slidably displace the pull rods for withdrawal from the anchoring blocks, each of the pull rods is pivotally connected by a pin connection to a control lever 88 pivotally mounted by pivot pin 90 within the bracket assembly 62. The top pull rod 76 is therefore pivotally connected adjacent to the upper end of the control lever 88 on one side of the pivot pin 90 of the control lever while the pull rods 82 and 86 are pivotally connected to the control lever 88 on the lower side of the pivot pin 90. A return spring 92 is connected between the lower end of the control lever 88 and the base 28 for the purpose of biasing the control lever and the pull rod connected thereto to a belt anchoring position. Displacement of the control lever 88 from its belt anchoring position against the bias of spring 92 will therefore release all of the anchoring blocks.

Pivotal displacement of the control lever 88 is therefore effected by a power-operated assembly which includes the power energized solenoid 38 the armature of which is connected by the universal connection 94 to the armature pull bar 96. The pull bar 96 is therefore pivotally connected to the control lever 88 by means of pin 98. Thus, when energized the solenoid 38 will effect pivotal displacement of the control lever 88 for releasing all of the anchoring blocks. The solenoid 38 is therefore connected by the conductors 32 and 34 to the vehicle power supply in a circuit maintained open by the normally open release switch 24. The conductors 32 and 34 are therefore connected by the terminal posts 100 and 102 on the terminal board 36 to the power supply and the release switch respectively.

It is also contemplated, as an additional safety measure, that after the power supply of the vehicle has been utilized for anchor releasing purposes, it will be disconnected so as to avoid the possibility of fire because of live powerlines. Accordingly, the power circuit for the vehicle will be connected to the terminal posts 104 and 106 on the terminal board 36 which in turn are connected by conductors 108 and 110 to a normally closed switch device 112. Upon opening of the switch device 112, the power supply of the vehicle will be disconnected. Accordingly, mounted on the armature pull rod 96, is a switch actuator 114 operative when displaced upon energization of the solenoid 38 to actuate the switch 112 for opening thereof and thereby disconnecting the power supply of the vehicle.

From the foregoing, operation and utility of the releasable seat belt anchoring assembly and the system with which it is associated, will be apparent. The system is accordingly schematically or diagrammatically illustrated in FIGURE 5 for such purpose, the vehicle power supply being diagrammatically illustrated at 116 in a simplified control circuit which is normally opened by the release control switch 24. Closing of the switch 24 under emergency conditions, will therefore cause energization of the solenoid 38 thereby displacing the armature pull bar 96 causing pivotal displacement of the control lever 88 about the pivot pin 90. All of the pull rods 76, 82 and 86 will therefore be displaced for release of the associated anchoring blocks. De-energization of the solenoid 38 will return the pull rods to their anchoring position under the influence of the return spring 92. Also, when displaced by energization of the solenoid 38, the switch 112 will be opened so as to disconnect the power supply 116 however only after the power supply has been utilized for release of the belt anchors.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a safety system for a vehicle having a power supply, a releasable anchoring assembly for safety seat belts comprising, spaced anchoring means engageable with said seat belts for anchoring thereof to the vehicle, power-operated means operatively connected to the spaced anchoring means for release of the seat belts when energized to permit loosening of said safety belts, selective control means operatively connecting said power supply to the power-operated means for energization thereof, and power cut-off means operative in response to said release of the seat belts for disconnecting the power supply from the power operated means only after release of the anchoring means.

2. In a safety system for a vehicle having a power supply, a releasable anchoring assembly for safety seat belts comprising, spaced anchoring means operative to anchor said seat belts to the vehicle, power operated means operatively connected to the spaced anchoring means for release thereof when energized to permit loosening of said safety belts, selective control means operatively connecting said power supply to the power operated means for energization thereof, and power cut-off means operative in response to release of the anchoring means by the power operated means for disconnecting the power supply, said spaced anchoring means including a base fixed to said vehicle, spaced bracket means mounted on said base, rod means slidably mounted by said bracket means, anchoring block means slidably receiving said rod means for anchoring thereof between said spaced bracket means and yieldable means connecting said anchoring block means to the base for elastic elongation in response to loosening of the safety seat belts after withdrawal of said rod means from the anchoring block means.

3. The combination of claim 2 wherein said power-operated means comprises, control lever means pivotally mounted on said base and biased to an anchoring position, means operatively connecting said control lever means to said rod means for withdrawal thereof from the block means in response to displacement of the control lever means, and solenoid operated armature means operatively connected to the control lever means for displacement thereof to a release position.

4. The combination of claim 3, wherein said selective control means comprises, normally open switch means electrically connected between said power supply and solenoid operated armature means.

5. The combination of claim 4 wherein said power cut-off means comprises normally closed switch means and switch actuating means mounted on said solenoid operated armature means for opening said switch means in response to displacement of the armature means.

6. The combination of claim 1 wherein said power-operated means comprises, control lever means biased to an anchoring position, means operatively connecting said control lever means to said spaced anchoring means for withdrawal thereof in response to displacement of the control lever means, and solenoid operated armature means operatively connected to the control lever means for displacement thereof to a release position.

7. The combination of claim 6 wherein said power cut-off means comprises normally closed switch means and switch actuating means mounted on said power-operated control means for opening said switch means in response to displacement of the armature means.

8. The combination of claim 1 wherein said power cut-off means comprises normally closed switch means and switch actuating means mounted on said power-operated means for opening said switch means in response to displacement of the power operated means.

9. In a safety system for a vehicle having a power supply, a releasable anchoring assembly for safety seat belts comprising, spaced anchoring means operative to anchor said seat belts to the vehicle, power operated means operatively connected to the spaced anchoring means for release thereof when energized to permit loosening of said safety belts, selective control means operatively connecting said power supply to the power operated means for energization thereof, and power cut-off means operative in response to release of the anchoring means by the power operated means for disconnecting the power supply, said power cut-off means comprising normally closed switch means and switch actuating means mounted on said power operated means for opening said switch means in response to displacement of the power operated means, said spaced anchoring means including a base fixed to said vehicle, spaced bracket means mounted on said base, rod means slidably mounted by said bracket means, anchoring block means slidably receiving said rod means for anchoring thereof between said spaced bracket means and yieldable means connecting said anchoring block means to the base for elastic elongation in response to loosening of the safety seat belts after withdrawal of said rod means from the anchoring block means.

10. In a safety system for a moving vehicle having an occupant therein, a power supply, a safety seat belt encircling said occupant and a releasable anchoring assembly normally holding the seat belt tightly about the occupant comprising, retractible means for releasably anchoring the seat belt to the vehicle to tightly hold the occupant, power operated means operatively connected to said retractible means for retraction thereof under emergency conditions to release the seat belts, control means operatively connecting said power operated means to the power supply for energization thereof under said emergency conditions, and means responsive to said release of the seat belt by said energization of the power operated means for disconnecting the power supply therefrom.

11. The combination of claim 10 including resilient means for loosely anchoring the seat belt to the vehicle when released by the retractible means.

References Cited by the Examiner
UNITED STATES PATENTS

| | | | |
|---|---|---|---|
| 2,802,073 | 8/57 | Simon. | |
| 2,845,676 | 8/58 | Huber. | |
| 2,868,309 | 1/59 | Burgess | 180—82 |
| 2,883,123 | 4/59 | Finnigan | 280—150 X |

PHILIP ARNOLD, *Primary Examiner.*